United States Patent
Kurematsu

(10) Patent No.: US 11,493,120 B2
(45) Date of Patent: Nov. 8, 2022

(54) SPROCKET AND DRIVE MECHANISM

(71) Applicant: TSUBAKIMOTO CHAIN CO., Osaka (JP)

(72) Inventor: Yuji Kurematsu, Osaka (JP)

(73) Assignee: TSUBAKIMOTO CHAIN CO., Osaka (JP)

( * ) Notice: Subject to any disclaimer, the term of this patent is extended or adjusted under 35 U.S.C. 154(b) by 431 days.

(21) Appl. No.: 16/801,472

(22) Filed: Feb. 26, 2020

(65) Prior Publication Data

US 2020/0309242 A1 Oct. 1, 2020

(30) Foreign Application Priority Data

Mar. 25, 2019 (JP) .............................. JP2019-056312

(51) Int. Cl.
*F16H 55/16* (2006.01)
*F16H 55/06* (2006.01)
*F16H 55/30* (2006.01)
*F16H 7/08* (2006.01)

(52) U.S. Cl.
CPC .............. *F16H 55/16* (2013.01); *F16H 55/06* (2013.01); *F16H 55/30* (2013.01); *F16H 2007/087* (2013.01)

(58) Field of Classification Search
CPC .... F16H 55/30; F16H 55/06; F16H 2055/306; F16H 55/171; F16H 55/14; F16H 2055/065
USPC ........................................................ 474/161
See application file for complete search history.

(56) References Cited

U.S. PATENT DOCUMENTS

| | | | | |
|---|---|---|---|---|
| 1,870,801 A | * | 8/1932 | Engstrom | F16H 55/30 74/505 |
| 3,469,468 A | * | 9/1969 | Cozzarin | F16H 55/06 74/439 |
| 3,504,562 A | * | 4/1970 | Hirych | B62D 55/0963 74/447 |
| 3,590,456 A | * | 7/1971 | Seaman | F16H 55/16 74/439 |
| 3,999,445 A | * | 12/1976 | Liautaud | B29C 45/14778 29/893.3 |
| 4,458,547 A | * | 7/1984 | Fina | F16H 55/06 74/DIG. 10 |
| 4,472,164 A | * | 9/1984 | Pusch | F16H 55/30 74/DIG. 10 |
| 4,589,860 A | * | 5/1986 | Brandenstein | F16H 55/06 74/DIG. 10 |

(Continued)

FOREIGN PATENT DOCUMENTS

| | | |
|---|---|---|
| JP | 2003-184996 A | 7/2003 |
| JP | 4235242 B1 | 3/2009 |

(Continued)

*Primary Examiner* — Henry Y Liu
(74) *Attorney, Agent, or Firm* — WHDA, LLP

(57) ABSTRACT

To provide a sprocket that reduces the influence of tension fluctuations concurrent with load torque changes to suppress noise and vibration and that allows for a weight reduction while retaining high strength as well as enables high productivity, and a drive mechanism that uses this sprocket. Sprocket teeth are configured by providing a cushioning layer on tooth faces of tooth portions of a sprocket base body made of a high-rigidity material. The sprocket teeth include the cushioning layer that varies in thickness.

5 Claims, 4 Drawing Sheets

(56) References Cited

U.S. PATENT DOCUMENTS

| | | | | |
|---|---|---|---|---|
| 4,752,281 A * | 6/1988 | Lammers | ........... | B62D 55/0963 474/161 |
| 4,867,733 A * | 9/1989 | Yamanoi | ................ | F16H 7/06 474/161 |
| 5,074,828 A * | 12/1991 | Ellis | ................ | B29C 70/347 474/161 |
| 5,098,346 A * | 3/1992 | Redmond | ............ | F16H 55/171 474/161 |
| 5,203,861 A * | 4/1993 | Irwin | ................ | F16H 55/30 474/161 |
| 6,071,204 A * | 6/2000 | Jefferies | ................ | F16H 55/30 474/161 |
| 6,213,905 B1 * | 4/2001 | White | ................ | F16H 7/06 474/148 |
| 7,032,983 B2 * | 4/2006 | Wu | ................ | F16H 55/30 305/195 |
| 7,048,972 B2 * | 5/2006 | Kitahata | ................ | B05D 3/12 427/295 |
| 7,097,580 B2 * | 8/2006 | Sakamoto | ............... | F16H 55/30 474/152 |
| 7,125,356 B2 * | 10/2006 | Todd | ................ | F16H 55/30 474/160 |
| 7,691,020 B2 * | 4/2010 | Sakura | ................ | F16H 55/30 474/212 |
| 7,814,809 B2 * | 10/2010 | Shinohara | ............... | F16H 55/06 74/411 |
| 8,062,158 B2 * | 11/2011 | Nakano | ................ | F01L 1/022 474/160 |
| 8,066,602 B2 * | 11/2011 | Todd | ................ | F16H 55/30 474/160 |
| 8,353,796 B2 * | 1/2013 | Ritz | ................ | F16H 55/30 474/155 |
| 9,404,565 B2 * | 8/2016 | Pfeiffer | ................ | F16H 55/30 |
| 9,581,230 B2 * | 2/2017 | Pfeiffer | ................ | F16H 55/30 |
| 10,385,958 B2 * | 8/2019 | Medaglia | ................ | B62M 3/00 |
| 2003/0228950 A1 * | 12/2003 | Young | ................ | F16H 57/0006 474/152 |
| 2005/0272545 A1 * | 12/2005 | Yamanishi | ............... | B22F 3/164 474/152 |
| 2009/0170648 A1 * | 7/2009 | Nakano | ................ | F16H 55/30 474/141 |
| 2010/0081530 A1 * | 4/2010 | Crump | ................ | B21K 1/30 29/893.3 |
| 2010/0137085 A1 * | 6/2010 | Nakano | ................ | F02B 67/06 474/155 |
| 2010/0151978 A1 * | 6/2010 | Todd | ................ | F16H 55/30 474/152 |
| 2010/0160098 A1 * | 6/2010 | Sonoda | ................ | F16H 55/30 474/101 |
| 2015/0093593 A1 * | 4/2015 | Asakawa | ............... | A01K 89/01 428/656 |
| 2016/0003340 A1 * | 1/2016 | Crump | ................ | F16H 55/30 474/152 |

FOREIGN PATENT DOCUMENTS

| | | |
|---|---|---|
| JP | 2009-156320 A | 7/2009 |
| JP | 4589598 B2 | 12/2010 |

\* cited by examiner

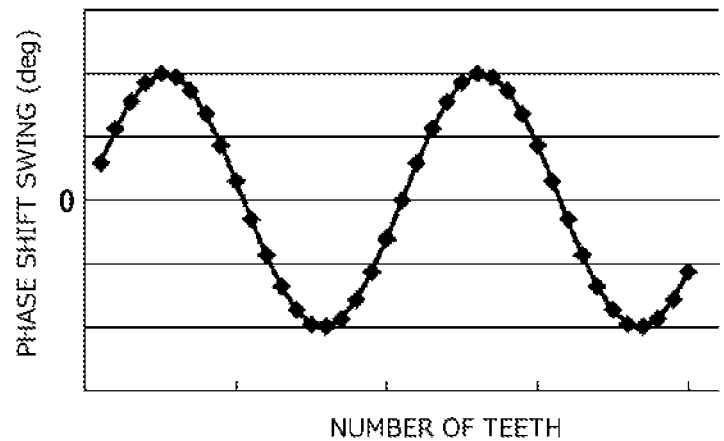

SPROCKET AND DRIVE MECHANISM

BACKGROUND OF THE INVENTION

1. Field of the Invention

The present invention relates to a sprocket having multiple sprocket teeth that mesh with a chain, and a drive mechanism that uses this sprocket.

2. Description of the Related Art

Drive mechanisms with a chain passing over sprockets that have multiple sprocket teeth formed on the circumferential surface thereof have been commonly used as a power transmission system that reliably transmits rotation.

While the sprocket teeth meshing with the chain reliably transmit the rotational force from one sprocket to another at given timing, noise and vibration are inevitably generated as the sprocket teeth and the chain mesh with each other. While plastic sprockets generate less meshing noise, there is the issue of insufficient load capacity.

Sprockets that suppress noise and vibration, in a drive mechanism where the load torque changes periodically with the rotation, by mitigating the influence of tension fluctuations concurrent with the load torque changes, are known (see, for example, Japanese Patent No. 4589590 and Japanese Patent No. 4235242). In order to reduce tension fluctuations in sync with periodic changes of the load torque, the sprocket teeth are arranged such that there is a phase variation pattern wherein the phase of engagement between the teeth and the chain is alternately advanced and retarded relative to a zero position where equidistant teeth would be in phase with the chain.

SUMMARY OF THE INVENTION

With the known sprocket, it is possible to suppress noise caused by vibration of the chain by reducing tension fluctuations of the chain. However, because of the periodic nature of the load torque changes, order noises corresponding to the frequency would still be inevitably generated.

There are also possibilities of tension fluctuations becoming larger, or of increased noise and vibration, contrary to the intention, if there is a shift in the phase of load torque change, or when resonance occurs depending on the relationship between the sprocket rpm and the natural frequency of the chain.

When the chain tension is low so that the load torque is small, or in regions where the chain and sprocket engage without being affected by the tension, the sprocket shape with multiple teeth thereof being arranged such that there is a phase variation pattern could cause tension fluctuations of the chain or vibration and noise, contrary to the intention.

Another problem was that there were limitations on the production method of the sprocket. For example, gear hobbing is not applicable because the pitch of the sprocket teeth is not constant.

An object of the present invention is to solve these problems and to provide a sprocket, which mitigates the influence of tension fluctuations concurrent with load torque changes to suppress noise and vibration and which allows for a weight reduction while retaining high strength as well enables high productivity, and a drive mechanism that uses this sprocket.

The present invention achieves the above object by providing a sprocket formed with a plurality of sprocket teeth that mesh with a chain, the sprocket including a sprocket base body made of a high-rigidity material and formed with a plurality of tooth portions on a circumferential surface thereof, and a cushioning layer provided at least on a tooth face of each of the plurality of tooth portions and forming the sprocket teeth together with the tooth portions, the sprocket teeth including the cushioning layer that varies in thickness.

The sprocket set forth in claim 1 provides a noise and vibration (NV) reduction effect by the cushioning properties (shock-absorbing characteristics) of the cushioning layer itself on the surface of the sprocket teeth, as well as achieves the NV reduction effect through variation of the characteristics of vibration transmitted from the chain to the sprocket by changing the thickness of the cushioning layer. It is thus possible to dynamically cancel torque changes to mitigate the influence of tension fluctuations, whereby noise and vibration can be suppressed.

Moreover, since the sprocket teeth are formed by the tooth portions of the sprocket base body made of a high-rigidity material and the cushioning layer, the sprocket weight can be made lighter while its high strength is retained.

According to the configuration set forth in claim 2, the sprocket base body is free of limitations in terms of production method, so that high productivity can be achieved, as the sprocket can be obtained reliably as desired by adjusting the thickness of the cushioning layer.

According to the configuration set forth in claim 1, the influence of tension fluctuations of the chain corresponding to periodic changes of load torque can be mitigated so that noise and vibration are suppressed, and engine rigidity can be lowered and use of acoustic absorbers can be reduced, whereby weight reduction and cost reduction can be achieved.

According to the configuration set forth in claim 1, the timing at which the phases of the cycle of change of the load torque and the cycle of increase and decrease in the phase variation pattern are shifted can be changed smoothly, which enables further suppression of order noises.

As the meshing sound (noise) is reduced, the engine rigidity can be lowered and use of acoustic absorbers can be reduced, whereby weight reduction and cost reduction of the engine or the like in which a chain drive mechanism including the sprocket is mounted can be achieved.

According to the configuration set forth in claim 5, the influence of torque changes, which is the major cause of noise and vibration, can be effectively mitigated.

According to the configuration set forth in claim 6, a sufficiently high strength of the sprocket can be maintained against the bending stress applied to the sprocket teeth when the sprocket is meshed with the chain, and since parts of the sprocket teeth where the applied pressure is low can be formed by the cushioning layer, a weight reduction can be achieved. Also, it is possible to increase the radius of curvature in parts where bending stress is generated when the sprocket meshes with the chain, which helps reduce the fatigue notch factor. The high strength can be maintained in this respect, too, and, thermal stress generated in the cushioning layer can be reduced.

A drive mechanism set forth in claim 7 can mitigate the influence of chain tension fluctuations corresponding to the load torque changes, whereby noise and vibration can be suppressed.

BRIEF DESCRIPTION OF THE DRAWINGS

FIG. 3A is a diagram illustrating one example of a phase variation pattern;

FIG. 3B is a diagram illustrating another example of the phase variation pattern;

DESCRIPTION OF THE PREFERRED EMBODIMENTS

The sprocket of the present invention may have any specific configuration as long as it is a sprocket formed with a plurality of sprocket teeth that mesh with a chain, and includes a sprocket base body made of a high-rigidity material and formed with a plurality of tooth portions on a circumferential surface thereof, and a cushioning layer provided at least on a tooth face of each of the plurality of tooth portions and forming the sprocket teeth together with the tooth portions, the sprocket teeth including the cushioning layer that varies in thickness.

The drive mechanism of the present invention may have any specific configuration as long as it is a drive mechanism having a plurality of sprockets and a chain passed over the plurality of sprockets, wherein at least one of the sprockets is configured by the sprocket according to the present invention.

The chain passed over the sprocket may be any chain such as a silent chain, roller chain, bushing chain and the like, or any other flexible drive members such as a timing belt that is configured to mesh with the teeth of a sprocket.

One embodiment of the present invention will be hereinafter described with reference to the drawings.

Figure 1:
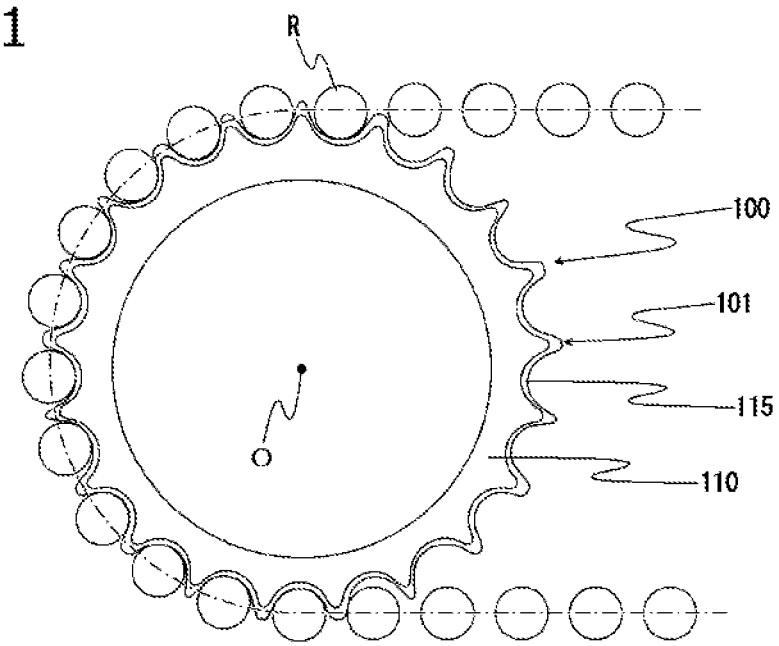
FIG. 1 is a schematic diagram illustrating the configuration of one example of a drive mechanism according to the present invention.

As shown in FIG. 1, multiple sprocket teeth 101 are formed on a circumferential surface of the sprocket 100 for meshing with a chain, or rollers R of a roller chain in this embodiment.

Figure 2:
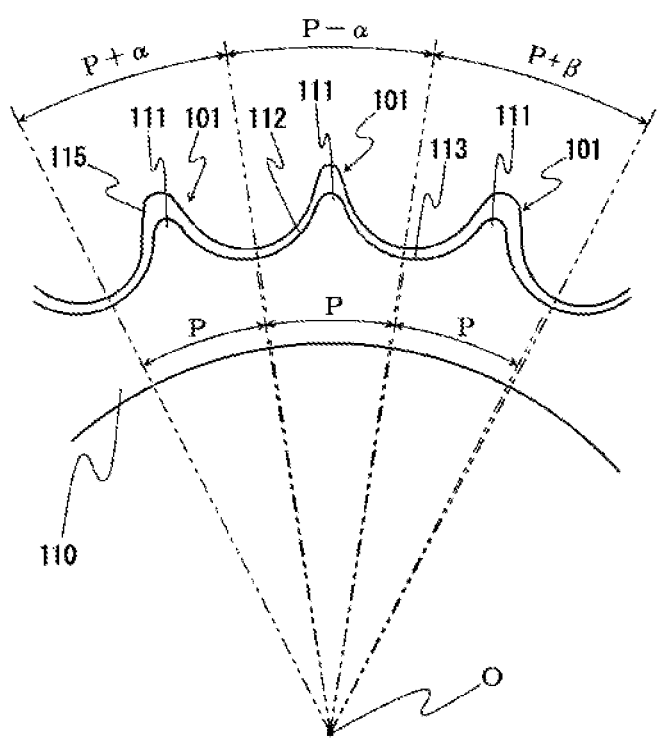
FIG. 2 is a diagram illustrating part of a sprocket according to the present invention used in the drive mechanism shown in FIG. 1 to a larger scale.

The sprocket 100 includes a sprocket base body 110 and a cushioning layer 115, as shown in part to a larger scale in FIG. 2.

The sprocket base body 110 has multiple tooth portions 111 formed on a pitch circle around the rotation center O of the sprocket 100.

The multiple tooth portions 111 of the sprocket 100 of this embodiment have the same shape and formed with an equal pitch therebetween.

The sprocket base body 110 is made of a high-rigidity material such as steel or other metal, or ceramics.

In this embodiment, the cushioning layer 115 of the sprocket 100 is provided on surfaces of the tooth face 112 of each tooth portion ill of the sprocket base body 110 and of the tooth root 113 positioned between adjacent tooth portions 111. The sprocket teeth 101 are made up of the tooth portions 111 of the sprocket base body 110 and the cushioning layer 115 provided on the tooth faces 112 of the tooth portions.

The material forming the cushioning layer 115 is not limited particularly and any material that has elasticity and reduces contact noise (meshing noise) generated when contacting the chain, such as synthetic resin, for example, may be used. The cushioning layer 115 can be formed by insertion molding, for example.

The cushioning layer 115 of the sprocket 100 according to this embodiment is provided such that its thickness changes continuously in the circumferential direction. The plurality of sprocket teeth 101 are therefore arranged such that there is a wave-like phase variation pattern wherein the phase of engagement between the teeth and the chain is advanced and retarded relative to a zero position where equidistant sprocket teeth are in phase with the chain.

The phase variation pattern may be set as shown in FIG. 3A, for example, wherein the cycle of increasing and decreasing swings in phase shift is repeated several times with a constant period. In a preferable setting, as shown in FIG. 3B, the cycle of increasing and decreasing swings in phase shift is repeated several times such that the period of the cycle is continuously reduced or increased in the circumferential direction.

More preferably, the phase variation pattern should be set such that the cycle of increase and decrease contains a portion identical to a cycle of major changes in torque. For example, the phase variation pattern may be set such that the phase shift changes continuously wherein the cycle of increase and decrease includes a cycle of a half period or double period of the cycle of changes in main input load.

Also, the phase variation pattern may be set such that the phase changes continuously wherein the cycle of increasing and decreasing swings in phase shift includes a cycle of a maximum period identical to the cycle of changes in load torque, or such that the phase changes continuously wherein the cycle of increase and decrease includes a cycle of a maximum period and a cycle of a minimum period that is half of the maximum period, or such that the amount of increase and decrease (the amount of phase shift) is continuously reduced or increased in the circumferential direction.

The sprocket 100 of this embodiment is provided with a phase variation pattern adjusting the thickness of the cushioning layer 115 to change the pitch of each sprocket tooth 101 ( . . . , P+α, P−α, P+β, . . . ) as shown in FIG. 2. In FIG. 2, P represents the pitch between the tooth portion 111 of the sprocket base body 110 and α, β represent numerical values that are different from each other.

Changing the pitch between the sprocket teeth 101 is a preferable method of forming a phase variation pattern. In a specific configuration, the thickness of the cushioning layer 115 may be adjusted to change the shape of the tooth faces (meshing surfaces) of the sprocket teeth 101, the radial meshing positions between the sprocket teeth and the chain, and other features.

Figure 4A:
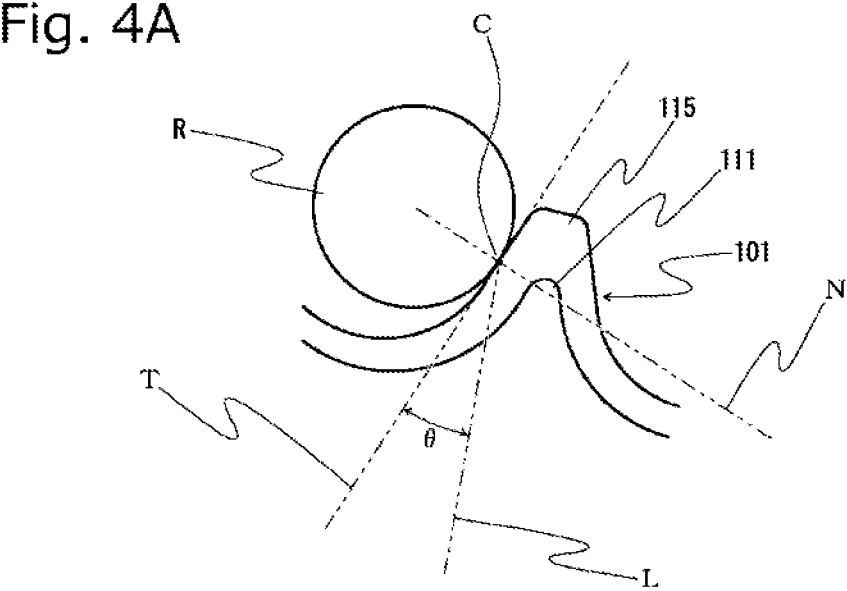
FIG. 4A is a schematic diagram illustrating a condition of a sprocket tooth of the sprocket and a roller of the chain in the present invention in meshing contact with each other.

The cushioning layer 115 is provided to the sprocket 100 of this embodiment such that, as shown in FIG. 4A, the tooth tip of the tooth portion 111 of the sprocket base body 110 is positioned on the radially outer side relative to a normal line N of the tooth face of the sprocket tooth 101 at the meshing contact point C between the sprocket tooth 101 and the chain. In FIG. 4A, T represents a tangential line of the tooth face of the sprocket tooth 101 at the meshing contact point C, L represents a radial line, and θ represents a working pressure angle.

Figure 4B:
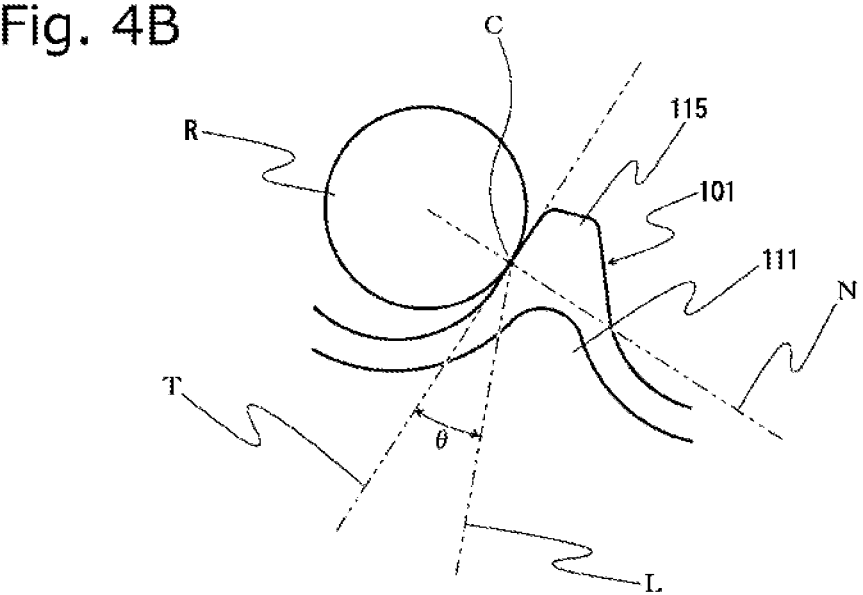
FIG. 4B is a schematic diagram illustrating a condition of a sprocket tooth of a sprocket and a roller of a chain in a comparative example in meshing contact with each other.

If the cushioning layer 115 is provided such as shown in FIG. 4B, for example, wherein the tooth tip of the tooth portion 111 of the sprocket base body 110 is positioned on the radially inner side relative to the normal line N of the tooth face of the sprocket tooth 101 at the meshing contact point C between the sprocket tooth 101 and the chairs, then, while the meshing noise itself can be reduced as with a plastic sprocket, the load capacity may become insufficient.

The sprocket 100 of this embodiment provides a noise and vibration (NV) reduction effect by the cushioning properties (shock-absorbing characteristics) of the cushioning layer 115 itself on the surface of the sprocket teeth 101, as well as achieves the NV reduction effect through variation of the characteristics of vibration transmitted from the chain to the sprocket 100 by changing the thickness of the cushioning layer 115. It is thus possible to dynamically cancel torque changes to mitigate the influence of tension fluctuations, whereby noise and vibration can be suppressed.

Moreover, the following effects are provided depending on the phase variation pattern that is formed by adjusting the thickness of the cushioning layer 115.

Namely, if, through adjustment of the thickness of the cushioning layer 115, the phase variation pattern is formed such that the cycle of increase and decrease is repeated several times wherein the period of the cycle is continuously reduced or increased in the circumferential direction, then order noises corresponding to the period of the cycle can be suppressed, so that meshing sound (noise) can be reduced.

If, through adjustment of the thickness of the cushioning layer 115, the phase variation pattern is formed such that the cycle of increase and decrease contains a portion identical to a cycle of major changes in torque, then the periodic nature of chain tension can be eliminated by continuously changing the cycle of fluctuations of the chain tension caused by the phase variation, whereby a match with the natural frequency (of the chain) that can result in peak tensions can be avoided (resonant peak reduction effect), and peaks of the chain tension (peaks of the meshing force) can be lowered. If there are periodic fluctuations in the input load of the timing system, the abovementioned effect can be achieved reliably by changing the phase continuously in such a phase variation pattern as to include a cycle of a half period or double period of the cycle of changes in main input load.

If, through adjustment of the thickness of the cushioning layer 115, the phase variation pattern is formed such that the phase changes continuously wherein the cycle of increase and decrease includes a cycle of a maximum period identical to the cycle of changes in load torque, or such that the phase changes continuously wherein the cycle of increase and decrease includes a cycle of a maximum period and a cycle of a minimum period that is half of the maximum period, then the chain tension can be reduced in parts where the chain is wound around.

If, through adjustment of the thickness of the cushioning layer 115, the phase variation pattern is formed such that the amount of increase and decrease (the amount of phase shift) is continuously reduced or increased in the circumferential direction, then the chain tension can be reduced without compromising the chain strength.

While one embodiment of the present invention has been described above in detail, the present invention is not limited to this embodiment and may be carried out with various design changes without departing from the scope of the present invention set forth in the claims.

For example, the cushioning layer may be provided at least on the tooth faces of tooth portions of the sprocket base body, and may not necessarily be provided on the surfaces of tooth roots.

The plurality of tooth portions of the sprocket base body may not necessarily have an identical shape. The sprocket base body may instead include tooth portions of different shapes. More specifically, the sprocket base body may include tooth portions with different heights, shapes of the tooth faces, radii of the tooth root circle, or other different features. The pitch between the plurality of tooth portions may not necessarily be an equal pitch.

Figure 5:
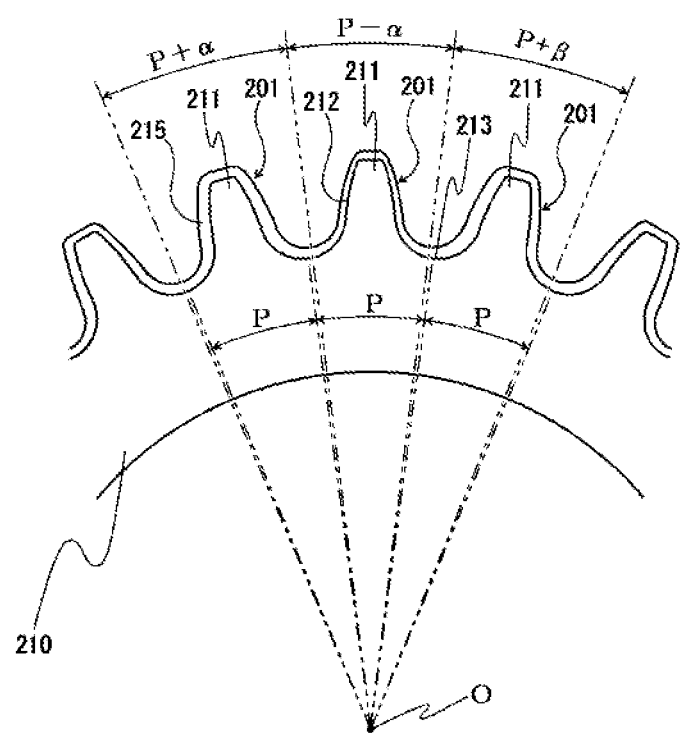
FIG. 5 is a diagram illustrating part of another configuration example of a sprocket according to the present invention to a larger scale.

While a sprocket that meshes with rollers of a roller chain was described as one example in the embodiment above, the sprocket of the present invention may also be a sprocket that meshes with plate teeth of a silent chain. Such a sprocket, too, as shown in FIG. 5, may be configured to include a sprocket base body 210 made of a high-rigidity material, and a cushioning layer 215 provided on a circumferential surface of the sprocket base body 210 and forming sprocket teeth 201 together with tooth portions 211 of the sprocket base body 210, the sprocket teeth 201 including the cushioning layer 215 that varies in thickness. The sprocket of this embodiment is provided with the cushioning layer 215 on the surfaces of the tooth faces 212 of tooth portions 211 and of the tooth roots 213 between the tooth portions 211, and the thickness of the cushioning layer 215 is adjusted to change the pitch between the sprocket teeth 201 ( . . . , P+α, P−α, P+β, . . . ) to form a phase variation pattern. The configuration where the phase variation pattern is formed is not limited to a particular one.

What is claimed is:

1. A sprocket formed with a plurality of sprocket teeth that mesh with a chain, the sprocket comprising:
    a sprocket base body made of a high-rigidity material and formed with a plurality of tooth portions on a circumferential surface thereof, and a cushioning layer provided at least on a tooth face of each of the plurality of tooth portions and forming the sprocket teeth together with the tooth portions,
    the sprocket teeth including the cushioning layer that varies in thickness,
    wherein the cushioning layer is provided such as to have a circumferentially continuously changing thickness, and
    the plurality of sprocket teeth are arranged such that there is a wave-like phase variation pattern wherein a phase of engagement between the teeth and the chain is advanced and retarded relative to a zero position where equidistant sprocket teeth are in phase with the chain, and
    wherein the phase variation pattern includes a cycle of increase and decrease repeated a plurality of times, the cycle of increase and decrease having a period that is continuously reduced or increased in a circumferential direction.

2. The sprocket according to claim 1, wherein the plurality of tooth portions on the sprocket base body have an identical shape and are formed with an equal pitch on a pitch circle around a rotation center of the sprocket.

3. The sprocket according to claim 1, wherein the phase variation pattern includes a cycle of increase and decrease repeated a plurality of times, the cycle of increase and decrease containing a portion identical to a cycle of major changes in torque.

4. The sprocket according to claim 1, wherein the cushioning layer is provided such that a tooth tip of a tooth portion of the sprocket base body is positioned on a radially outer side relative to a normal line of a tooth face of a sprocket tooth at a meshing contact point between this sprocket tooth and the chain.

5. A drive mechanism comprising a plurality of sprockets and a chain passed over the plurality of sprockets, at least one of the sprockets being the sprocket according to claim 1.

\* \* \* \* \*